United States Patent
Farrugia et al.

(10) Patent No.: US 10,655,025 B2
(45) Date of Patent: May 19, 2020

(54) CURABLE UNSATURATED CRYSTALLINE POLYESTER POWDER AND METHODS OF MAKING THE SAME

(71) Applicant: XEROX CORPORATION, Norwalk, CT (US)

(72) Inventors: Valerie M. Farrugia, Oakville (CA); Michael S. Hawkins, Cambridge (CA); Guerino G. Sacripante, Oakville (CA); Edward G. Zwartz, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 52 days.

(21) Appl. No.: 15/982,689

(22) Filed: May 17, 2018

(65) Prior Publication Data

US 2019/0352521 A1  Nov. 21, 2019

(51) Int. Cl.

| | |
|---|---|
| *C09D 11/104* | (2014.01) |
| *B33Y 70/00* | (2020.01) |
| *B29B 9/10* | (2006.01) |
| *B29B 9/16* | (2006.01) |
| *C08G 63/52* | (2006.01) |
| *C08J 3/14* | (2006.01) |
| *B29K 67/00* | (2006.01) |

(52) U.S. Cl.
CPC ............. *C09D 11/104* (2013.01); *B29B 9/10* (2013.01); *B29B 9/16* (2013.01); *B33Y 70/00* (2014.12); *C08G 63/52* (2013.01); *C08J 3/14* (2013.01); *B29B 2009/168* (2013.01); *B29K 2067/06* (2013.01); *C08G 2150/20* (2013.01); *C08J 2367/06* (2013.01)

(58) Field of Classification Search
CPC ........ B29B 2009/125; B29B 2009/168; B29B 9/10; B29B 9/12; B29B 9/16; C08J 2367/06; C08J 2483/04; C08J 2491/00; C08J 3/14; C08J 3/16; G03G 9/09758
See application file for complete search history.

(56) References Cited

U.S. PATENT DOCUMENTS

| | | | |
|---|---|---|---|
| 3,419,637 A | 12/1968 | Parker et al. | |
| 3,896,098 A | 7/1975 | Lasher | |
| 5,393,630 A * | 2/1995 | Bayley .................. | G03G 9/081 430/105 |
| 5,536,613 A * | 7/1996 | Chang .................... | G03G 9/081 430/137.1 |
| 5,800,861 A | 9/1998 | Chiang et al. | |
| 5,972,272 A | 10/1999 | Nagase et al. | |
| 6,110,411 A | 8/2000 | Clausen et al. | |
| 7,208,563 B2 | 4/2007 | Shirai | |
| 7,851,519 B2 | 12/2010 | Agur et al. | |
| 8,114,334 B2 | 2/2012 | Martinoni et al. | |
| 8,460,451 B2 | 6/2013 | Xu et al. | |
| 8,834,777 B2 | 9/2014 | Simon et al. | |
| 8,981,010 B2 | 3/2015 | Schmidt et al. | |
| 9,399,699 B1 | 7/2016 | Zhou et al. | |
| 9,611,355 B2 | 4/2017 | Martinoni et al. | |
| 10,196,472 B2 | 2/2019 | Yamamoto et al. | |
| 2009/0226748 A1 | 9/2009 | Brouns et al. | |
| 2012/0276593 A1 | 11/2012 | Li et al. | |
| 2016/0177078 A1 | 6/2016 | Naito et al. | |

FOREIGN PATENT DOCUMENTS

| | | |
|---|---|---|
| JP | 2012116882 A | 6/2012 |
| WO | 2016/021159 A1 | 11/2016 |
| WO | 2017/063352 A1 | 4/2017 |
| WO | 2018/015553 A1 | 1/2018 |
| WO | 2018/085245 A1 | 5/2018 |

OTHER PUBLICATIONS

Schmid, M. et al., Polymer Powders for Selective Laser Sintering (SLS); ETH-Zürich, 2014.
Wisanrakkit, G. et al. J. Appl. Polym. Sol., 42, 2453 (1991).
European Patent Office: "Extended European Search Report" re: Patent application No. 19174245.1-1107 of Xerox Corporation, dated Aug. 22, 2019, 7 pages.
European Patent Office: "Extended European Search Report" re: Patent application No. 19174244.4-1107 of Xerox Corporation, dated Jul. 11, 2019, 6 pages.
Bartolo, P.J., et al.: "Stereo-thermal-litography: a new principle for rapid prototyping", Rapid Prototyping Journal, MCB University Press, Bradford, GB, vol. 9, No. 3, Jan. 1, 2003 (Jan. 1, 2003), pp. 150-156, XP002602658, ISSN: 1355-2546, DOI: 10.1108/13552540310477454.
Filipa A M M Goncalves, et al.: 3D printing of new biobased unsaturated polyesters by microstereo-thermal-lithography, Biofabrication, vol. 6, No. 3, Sep. 5, 2014 (Sep. 5, 2014), p. 035024, XP055591939, UK ISSN: 1758-5082, DOI: 10.1088/1758-5082/6/3/035024.

* cited by examiner

*Primary Examiner* — Ling Siu Choi
*Assistant Examiner* — Gennadiy Mesh
(74) *Attorney, Agent, or Firm* — Pillsbury Winthrop Shaw Pittman LLP

(57) ABSTRACT

A process for producing unsaturated polyester microparticles comprising: melt-mixing an unsaturated polyester and an oil in an extruder; washing the microparticles with an organic solvent to reduce the amount of oil; and removing the organic solvent to form the microparticles.

9 Claims, 8 Drawing Sheets

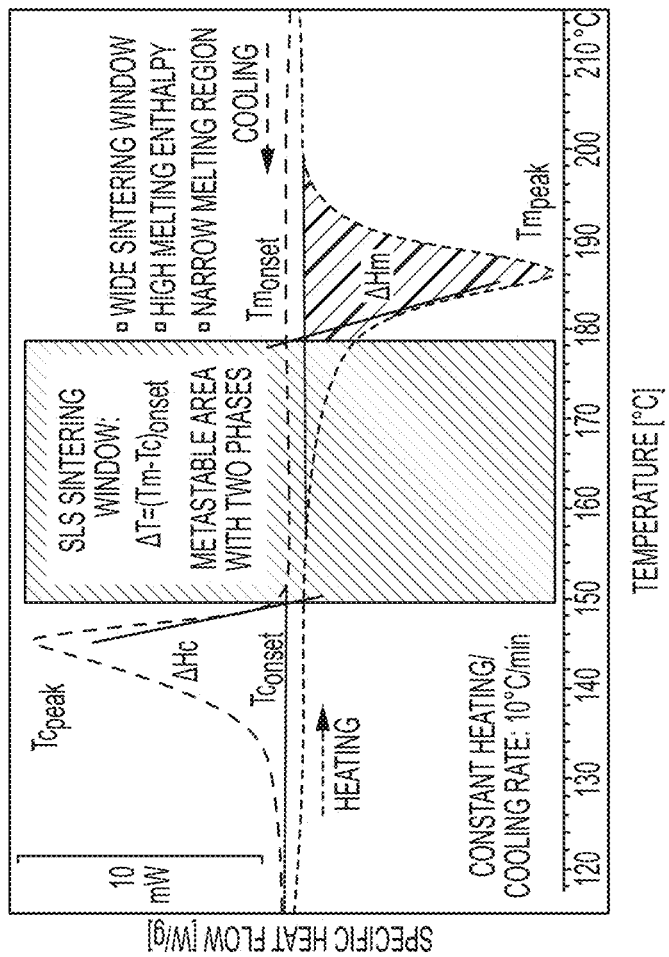
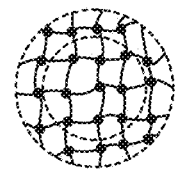
FIG. 1
FIG. 2

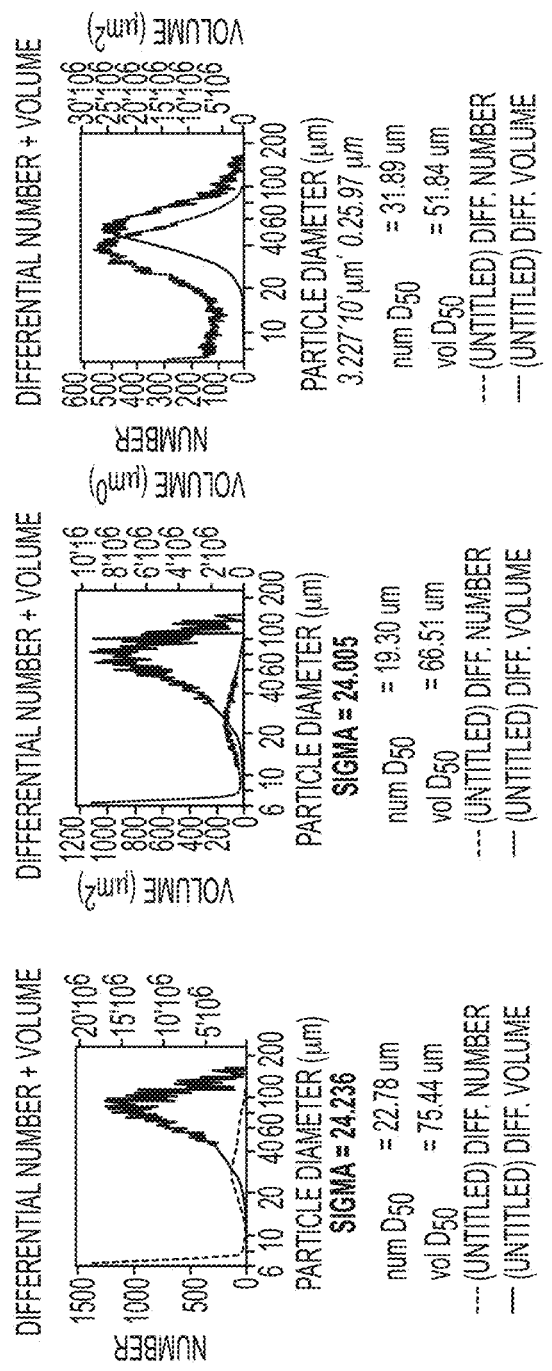

CURABLE UNSATURATED CRYSTALLINE POLYESTER POWDER AND METHODS OF MAKING THE SAME

CROSS REFERENCE TO RELATED APPLICATIONS

Reference is made to commonly owned and co-pending U.S. patent application Ser. No. 15/982,627 entitled "Compositions Comprising Unsaturated Crystalline Polyester For 3D Printing" to Shivanthi E. Sriskandha, et al., electronically filed on the same day herewith, the entire disclosure of which is incorporated herein by reference in its entirety.

BACKGROUND

The present disclosure relates to processes of preparing crystalline polyester (CPE) microparticles for 3D (3 dimensional) printing. More specifically, the present embodiments provide processes of preparing crystalline polyester (CPE) microparticles with large spherical particles (>20 microns) for selective laser sintering (SLS) 3D printing.

The selective laser sintering (SLS) technique for additive manufacturing (3D printing) uses a rasterized laser to "scan" over a bed of polymer powder, sintering it to form solid shapes in a layer-wise fashion. The material used for SLS is typically powdered polymers, either alone or in composite form. A selection of specifications and capabilities to meet various needs of downstream applications provides the impetus to develop new materials for 3D printing via the SLS process.

Selective Laser Sintering (SLS) 3D printing technology manufactures plastic parts by using a laser as the power source to sinter consecutive layers of polymeric powder. A problem that limits this technology from wide-ranging industrial scope is the narrow variety of applicable polymers. To date, only a few commercial polymers have been successfully applied to this technology mainly comprised of crystalline polyamides (PA), such as PA-11 or PA-12 and some limited use for other materials such as PA-6, thermoplastic polyurethanes (TPU) and polyether block amides (PEBA). Amorphous resins, elastomers or other more flexible materials such as polypropylene (PP) and polyethylene (PE), and higher performance materials crucial to broadening the material properties of 3D parts cannot be used. This limitation is due to the restricted requirement that a material must be crystalline and have a sharp melting point and re-crystallization point of approximately 30° C. to 50° C. difference in temperature.

In a SLS system, a $CO_2$ laser beam is used to selectively fuse or sinter the polymer particles deposited in a thin layer. Local full coalescence of polymer particles in the top powder layer is necessary as well as adhesion with previously sintered particles in the layers below. For crystalline or semi-crystalline polymers usually used in SLS processing, this implies that the crystallization temperature (Tc) should be inhibited during processing for as long as possible, or at least for several sintered layers. Thus, the processing temperature must be precisely controlled in-between melting (Tm) and crystallization (Tc) of the given polymer. This meta-stable thermodynamic region of undercooled polymer melt is called the 'sintering window' for a given polymer. The sintering window between onset points of Tc and Tm is about 30° C. to about 40° C. FIG. 1 demonstrates the differential scanning calorimetry (DSC) spectrum for PA-12 SLS powder. (Source: Schmid, et. al., "Polymer Powders for Selective Laser Sintering (SLS)"; ETH-Zürich, 2014.)

Polymer properties that are desired for successful SLS applications include the particles shape and surface of the SLS materials/powders. The more spherically shaped the polymer particles are, the more free-flowing properties they exhibit. Typically, a relatively non-spherical particles could potentially have a negative effect on flow and packing efficiency. This is a desired characteristic for the SLS materials as they are distributed on the part bed of an SLS machine by roller or blade systems and will not be compacted. To date, the currently available commercial SLS powders, such as Nylon PA-12, that are produced by precipitation processes described in Appl. Sci. 2017, 7, 462, are typically non-spherical shaped, so called "potato-shaped" particles. Particles obtained from cryogenic milling are also inadequate for SLS processing, because the cryogenic milled powders flow-ability generates low density and poor part bed surface in SLS machine.

Therefore, there is a need of more rigid or more flexible materials than the currently used polyamide (PA-6, PA-11 and PA-12). Additionally, there is a need for polymeric materials with lower temperature (Tc and Tm), such that lower power requirements is needed for the 3D printer, and processes of making such polymeric materials.

SUMMARY

In some aspects, embodiments herein relate to processes for making microparticles comprising providing an unsaturated polyester resin comprising: an ethylenically unsaturated monomer having the formula I

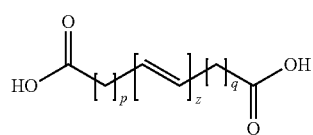

wherein p and q are each independently 0 to 8, and z is 1 to 5; a first diol monomer; and a second diol monomer; mixing and heating a mixture comprises the unsaturated polyester resin and an oil at a temperature above the melting point temperature (Tm) of the unsaturated polyester resin, and applying a pressure to the mixture to form a microparticle composite; washing the microparticle composite with an organic solvent to reduce the amount of oil present in the microparticle composite; and removing the organic solvent to form the microparticles.

In some aspects, embodiments herein relate to a process for making microparticles comprising providing an unsaturated polyester resin comprising: an ethylenically unsaturated monomer derived from maleic acid, maleic anhydride, fumaric acid, chloromaleic acid, itaconic acid, 3-hexenedioic acid, 2-heptenedioic acid, 2-octenedioic acid, glutaconic acid, 2-decenedioic acid, traumatic acid, muconic acid, mesaconic acid, citraconic acid, and esters and mixtures thereof; a first diol monomer; and a second diol monomer; mixing and heating a mixture comprises the unsaturated polyester resin, an oil and a thermal initiator at a temperature above the melting point temperature (Tm) of the unsaturated polyester resin, and applying a pressure to the mixture to form a microparticle composite; washing the microparticle composite with an organic solvent to reduce the amount of oil present in the microparticle composite; and removing the organic solvent to form the microparticles.

BRIEF DESCRIPTION OF DRAWINGS

Various embodiments of the present disclosure will be described herein below with reference to the figures wherein:

FIG. 1 shows the differential scanning calorimetry (DSC) spectrum for PA-12 SLS powder; reproduced from Schmid, M., Amado, A., Wegener, K., 30th International Conference of the Polymer Processing Society, Cleveland, Ohio, USA, Jun. 8-12, 2014.

FIG. 2 shows the formation of a crosslinked crystalline polyester (CPE) microparticle according to certain embodiments of the disclosure.

FIGS. 8d-f show the particle size distribution data of the CPE microparticles made from 1:1.33 (CPE to PDMS) using the control process, the CPE microparticles made from 1:1.66 (CPE to PDMS) using the control process, and the CPE microparticles made from 1:1 (CPE to PDMS) using the extruded particle process, respectively.

DETAILED DESCRIPTION

Figure 3:
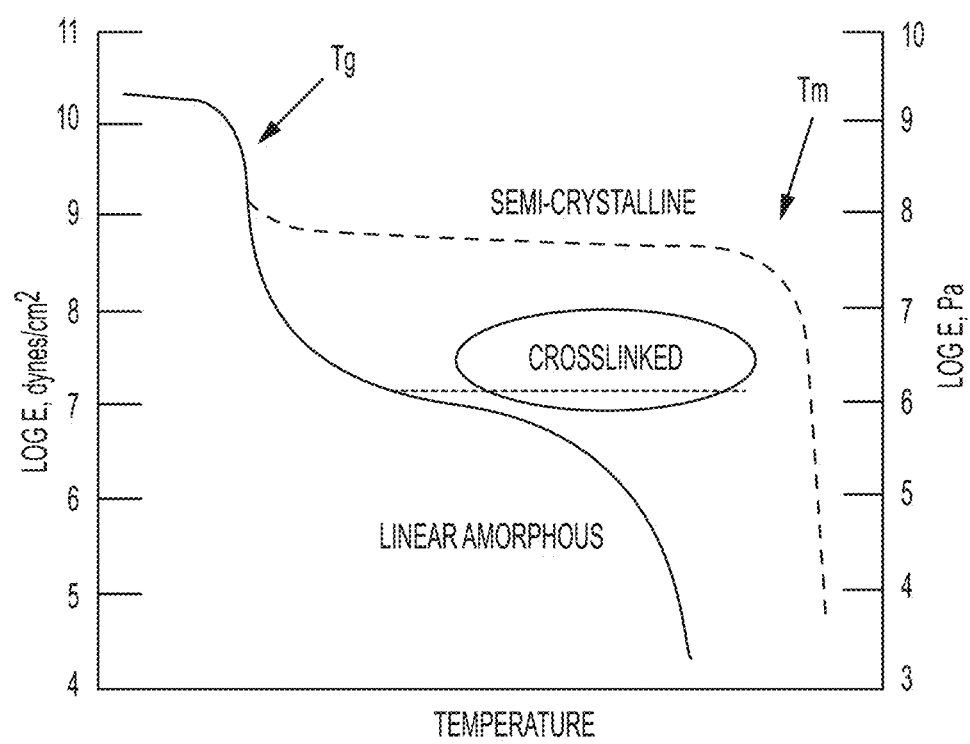
FIG. 3 shows a schematic of the Young's Modulus (E)/Temperature relationship for various types of polymers; Wisanrakkit and Gillham, J. Appl. Polym. Sci., 42, 2453 (1991).

Embodiments herein provide processes of making unsaturated polyester resins for use in selective laser sintering (SLS) 3-D printing technology.

In accordance with the present embodiments, the process of making crystalline polyester (CPE) microparticles (interchangeably herein with the term "microparticles") may be carried out by heating and applying pressure to melt an unsaturated polyester resin within an oil environment, meaning that the unsaturated polyester resin is surrounded by an oil, or mixed with an oil. The term "microparticle" refers generally to particles that have sizes in the range of from about 6 to about 100 microns, from about 15 to about 75 microns, or from about 20 to about 60 microns, in both average volume diameter and average number diameter, with a geometric standard deviation (GSD v and n; used exchangeably with the term "narrow particle size distribution") in the range of from about 2.5 to about 1.4, or from about 2.0 to about 1.3, or 1.3 or less, as measured by a conventional Coulter Counter (e.g., Microsizer II).

The GSD refers to the upper geometric standard deviation (GSD) by volume (coarse level) for (D84/D50) and the geometric standard deviation (GSD) by number (fines level) for (D50/D16). The particle diameters at which a cumulative percentage of 50% of the total toner particles are attained are defined as volume D50, and the particle diameters at which a cumulative percentage of 84% are attained are defined as volume D84. These aforementioned volume average particle size distribution indexes GSDv can be expressed by using D50 and D84 in cumulative distribution, wherein the volume average particle size distribution index GSDv is expressed as (volume D84/volume D50). These aforementioned number average particle size distribution indexes GSDn can be expressed by using D50 and D16 in cumulative distribution, wherein the number average particle size distribution index GSDn is expressed as (number D50/number D16). The closer to 1.0 that the GSD value is, the less size dispersion there is among the particles. The aforementioned GSD value for the microparticles indicates that the microparticles are made to have a narrow geometric standard deviation or narrow particle size distribution.

In embodiments, the process of making CPE microparticles may be carried out by using a hot melt extruder.

The process of the disclosure includes contacting the unsaturated polyester resin with an oil to form a mixture. The oil aids as a polymer solvent and coacervating agent which causes the polymer to coalesce and form coacervate droplets which eventually harden into microparticles during cooling to ambient temperature. After the microparticles are fully hardened, the oil may be washed away with an oil-miscible solvent. Phase separation occurs between the oil and crystalline polyester above a critical volume fraction of the oil, which depends on the polymer concentration, the polymer molecular weight and the temperature. In embodiments, the oil is a non-silicone oil, which can be an unsaturated oil, such as poppy seed oil, olive oil, peanut oil, sesame oil, cotton seed oil, soybean oil, safflower oil, corn oil, sunflower seed oil and canola oil; or a saturated oil, such as mineral oil, long chain paraffinic oil, and liquid petrolatum. In embodiments, the oil is a silicone oil. In embodiments, the oil is a mixture of a silicone oil and a non-silicone oil. Specific examples of silicone oil include, but are not limited to, diorganopolysiloxane, organofunctional siloxane, silicone polyether, silicone alkyl wax, phenyl silicone, fluorosilicone, linear siloxanes, cyclic siloxanes, aminofunctional oligosiloxanes, and mixtures thereof. Examples of diorganopolysiloxane include, without limitation, polydimethylsiloxane (PDMS), ethylmethylpolysiloxane, a copolymer of diraethylsiloxane and methylvinylsiloxane, and mixtures of such polymers or copolymers having OH ends. Examples of linear siloxanes include, but are not limited to, hexamethyldisiloxane, octamethyltrisiloxane. Examples of cyclic siloxanes include, but are not limited to octamethyltetracyclosiloxane, decamethylpentacyclosiloxane. In embodiments, the oil comprises diorganopolysiloxane. In embodiments, the oil comprises polydimethylsiloxane.

In order to form the CPE microparticles within the desired particle size range of from about 5 to about 100 microns in both average volume diameter and average number diameter, and with a narrow geometric size distributions (GSD) between 1.3 and 2.0, it is desired that the weight ratio of the unsaturated polyester resin to oil to be within a particular range of from about 0.5:2.0 to about 1.5:0.5, from about 0.75:1.8 to about 1.25:0.75, from about 1.0:1.6 to about 1.1:1.0, from about 0.25:1.0 to about 1.0:0.33, from about 0.42:1.0 to about 1.0:0.6, or from about 0.63:1.0 to about 1.0:0.90. The weight ratio is referred to the weight ratio of the amount of unsaturated polyester resin and the amount of oil present prior to applying pressure to the mixture containing the unsaturated polyester resin and the oil.

In embodiments, the process includes mixing the unsaturated polyester resin and an oil. The unsaturated polyester resin may be pre-mixed with an oil, an optional thermal initiator, and other optional additives, either at room temperature or at an elevated temperature, prior to feeding into the hot melt extruder. The unsaturated polyester resin, the oil, the optional thermal initiator, and other optional additives may be added separately into the hot melt extruder.

In embodiments, the process includes heating a mixture containing an unsaturated polyester resin and an oil. The mixture of the unsaturated polyester resin, the oil, and the optional thermal initiator may be heated at a temperature above the melting point (Tm) of the unsaturated polyester resin, prior to mixing or during mixing. In embodiments, the mixture of the unsaturated polyester resin, oil, and the optional thermal initiator may be heated at a temperature of from about 75 to about 150° C., from about 95 to about 130° C., or from about 100 to about 120° C.

The mixture of the unsaturated polyester resin, the oil, the optional thermal initiator, and other optional additives may be mixed in the extruder at a speed of from about 50 rotations per minute ("rpm") to about 1500 rpm, in embodiments from about 250 rpm to about 1000 rpm, or from about 225 rpm to about 500 rpm. The mixing or contacting may be conducted from about 1 minute to about 60 minutes, from about 5 minute to about 30 minutes, or from about 10 minute to about 20 minutes. This intensive mixing helps achieve molecular level mixing of the unsaturated polyester resin, the oil, the optional thermal initiator, and other optional additives. This type of molecular mixing is able to convert the mixture into a microparticle composite with uniform shape and density. The process includes applying a pressure of about 0 to about 50 meter-grams (mg) to the microparticle composite, in embodiments, forcing the material through an orifice or die, to form microparticles. The unit "meter-gram" refers to the power exerted in raising one gram through the distance of one meter against gravitation. In embodiments, the microparticles are cooled to room temperature (i.e., between 20° C. to 25° C.).

Such microparticle composites may have a viscosity of from 1,000 to 100,000 cP measured at a temperature between 75° C. and 150° C. In embodiments, the microparticle composites may have a viscosity of from 1,000 to 100,000 cP measured at a temperature between 75° C. and 150° C. In embodiments, the microparticle composites may have a viscosity of from 5,000 to 250,000 cP, from 10,000 to 100,000 cP, or from 50,000 to 100,000 cP measured at a temperature between 20° C. and 30° C.

Such microparticle composites may have a density of from 0.8 to about 1.30. Such microparticle composites may have an average circularity of at least 0.950 as measured by a Sysmex FPIA-2100 (Flow Particle Image Analyzer).

The process includes washing the microparticles to remove or to reduce the amount of the oil from the microparticles. The washing may be performed by contacting the microparticles with an organic solvent, such as, ethyl acetate, acetone, tetrahydrofuran, dimethylsulfoxide, methanol and mixtures thereof. In embodiments, the process includes removing the organic solvent from the microparticles after the washing step, for example, by filtering through a filter paper or by centrifugation.

Thermal Initiators

In embodiments, thermal initiators may be added to the surface of the microparticles after the washing step. As discussed above, thermal initiators may also be combined with the CPE during the extrusion process (i.e., during heating and mixing steps). In embodiments, the thermal initiator exhibits a half-life of less that of the dissolution temperature. As used herein, the half-life is the time required to reduce the original thermal initiator content at a given temperature by 50%. As used herein, the dissolution temperature is the maximum temperature inside the extruder for heating the mixture of the unsaturated polyester resin, the oil, the optional thermal initiator, and other optional additives. If the dissolution temp exceed the half-life temperature of the thermal initiator in the mixture, the CPE will crosslink prematurely during extrusion and not during SLS printing of these microparticles.

The thermal initiator is not particularly limited. Examples of suitable thermal initiators include water soluble initiators, such as ammonium persulfate, sodium persulfate, and potassium persulfate, organic soluble initiators including organic peroxides, and azo compounds including Vazo peroxides, such as VAZO 64™, [2,2'-azobis(2-methylpropanenitrile) or 2,2'-azobis(isobutyronitrile) also known as AIBN]; VAZO 88™, [1,1'-azobis(cyclohexanecarbonitrile) or 1,1'-azobis(cyanocyclohexane)]; 2,2'-Azodi(2-methylbutyronitrile (Vazo™ 67), and combinations thereof. Other suitable water-soluble initiators which may be used include azoamidine compounds, for example 2-methyl 2-2'-azobis propanenitrile, 2-2'-azobis isobutyramide dehydrate, 2, 2'-azobis(2-methyl-N-phenylpropionamidine) dihydrochloride, 2,2'-azobis[N-(4-chlorophenyl)-2-methylpropionamidine] dihydrochloride, 2,2'-azobis[N-(4-hydroxyphenyl)-2-methylpropionamidine]dihydrochloride, 2,2'-azobis[N-(4-aminophenyl)-2-methylpropionamidine]tetrahydrochloride, 2,2'-azobis[2-methyl-N(phenylmethyl)propionamidine] dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, combinations thereof, and the like.

The addition of a thermal initiator to the CPE microparticles strengthen the CPE microparticles through thermal crosslinking. FIG. 2 illustrates, in certain embodiments, the process of crosslinking a CPE microparticle with an initiator or coating of an initiator onto the CPE microparticle surface.

Unsaturated Crystalline Polyester (CPE)

Optimal materials for SLS printing are crystalline and possess sharp melting points. The unsaturated crystalline polyester (CPE) (used interchangeable with "unsaturated polyester" or "unsaturated polyester resins"), like the commercial PA-12 having a very similar DSC profile, but shifted to lower temperatures. The lower viscosity of CPE allows for printed objects with improved finishes, eliminating polishing or chemical surface treatment. As discussed above, the unsaturated CPE can be crosslinked with thermal initiators to form thermosetting resins. Crosslinked unsaturated CPE has greater strength and improved mechanical properties compared with its uncrosslinked counterpart. FIG. 3 shows a schematic of a typical Young's Modulus (E)/Temperature relationship for crosslinked and uncrosslinked polymers.

The unsaturated CPE of the embodiments may be derived from a diacid of Formula I (ethylenically unsaturated monomer), and at least two aliphatic diols of Formula II.

The general synthetic scheme for the preparation of the unsaturated polyester of Formula III is shown below:

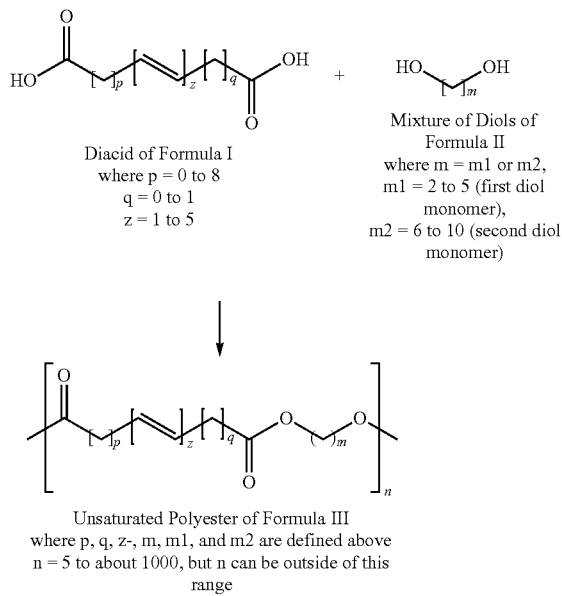

In embodiments, the unsaturated CPE of the embodiments may be derived from fumaric acid, and at least two aliphatic diols of Formula II.

In embodiments, the unsaturated CPE of the embodiments may be derived from fumaric acid, and two aliphatic diols, such as, 1,4-butanediol (1,4-BD) and 1,6-Hexane-diol (1,6-HD). The synthetic scheme for the preparation of the unsaturated polyester from fumaric acid and 1,4-BD and 1,6-HD is shown below:

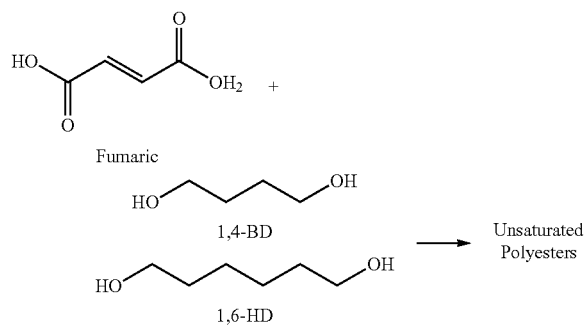

Examples of the ethylenically unsaturated monomer include, but are not limited to, maleic acid, maleic anhydride, fumaric acid, chloromaleic acid, itaconic acid, 3-hexenedioic acid, 2-heptenedioic acid, 2-octenedioic acid, glutaconic acid, 2-decenedioic acid, traumatic acid, muconic acid, mesaconic acid, citraconic acid and esters and anhydrides thereof, and mixtures thereof.

The ethylenically unsaturated monomer reacts with at least two different aliphatic diols (i.e., the first diol monomer, and the second diol monomer) to form an unsaturated polyester of Formula III.

The two aliphatic diols differ in the number of carbon atoms in the molecule, where the first diol monomer contains from 2 to 5 carbon atoms (m1=2 to 5), and the second diol monomer contains from 6 to 10 carbon atoms (m2=6 to 10). In embodiments, the first diol monomer contains from 2 to 4 carbon atoms, or 3 to 4 carbon atoms. In embodiments, the second diol monomer contains from 6 to 9 carbon atoms, or 6 to 8 carbon atoms. Examples of the aliphatic diols include, but are not limited to, 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 2,2-dimethylpropanediol, 2,2,3-trimethylhexanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, 2,2-dimethylpropane-1,3-diol (neopentyl glycol), hexane-2,5-diol, hexane-1,6-diol, and the combinations thereof.

In embodiments, the carbon chain of any aliphatic diol may be optionally substituted at any carbon atom. Such optional substitution may include halogen, $C_1$-$C_4$ alkyl, $C_1$-$C_4$ alkoxy, and combinations thereof.

By varying the molar ratio of the first diol monomer (Formula II, where m1=2 to 5) and the second diol monomer (Formula II, where m2=6 to 10), and reacting these monomers with the ethylenically unsaturated monomer (Formula I), a series of unsaturated polyester resins (Formula III) with varying melting and re-crystallization temperatures can be made. The molar ratio of the first diol monomer to the second diol monomer may be from 80:20 to about 60:50, from 75:25 to 65:35, and preferably 70:30.

The higher the molar ratio of the first monomer to the second monomer, the lower the melting point of the resulting unsaturated polyester resin.

In embodiments, the first diol monomer is present from about 30 to about 90 mole percent (mol %), from about 40 to about 80 mol %, or from about 50 to about 75 mol %, of the unsaturated polyester resin.

In embodiments, the second diol monomer is present from about 5 to about 50 mole percent (mol %), from about 10 to about 40 mol %, or from about 15 to about 35 mol %, of the unsaturated polyester resin.

In embodiments, the unsaturated polyester resin has a crystallization temperature (Tc) of from about 50° C. to about 70° C.

In embodiments, the unsaturated polyester resin has a melting temperature (Tm) of from about 75° C. to about 110° C.

Although lower melting unsaturated polyester resins can be obtained by increasing the first monomer content, it is desired that the re-crystallization temperature of the unsaturated polyester resin is greater than 58° C. If the recrystallization temperature is less than 58° C., the toner particles will stick together when exposed to elevated temperatures and cause blocking (or cohesion). Blocking is a phenomena where toner subjected to high temperatures softens and toner particles coagulate.

It is desired that the unsaturated polyester resin is derived from at least 25 mol percent (in embodiments, at least 30 mol percent, at least 35 mol percent, at least 40 mol percent, at least 45 mol percent, or at least 50 mol percent) of ethylenically unsaturated monomer (diacid), such that the unsaturated polyester resin can be cured (crosslinked) thermally in the presence of a thermal initiator. In embodiments, the unsaturated polyester resin is derived from between 30 mol percent and 95 mol percent, between 40 mol percent and 90 mol percent, between 50 mol percent and 85 mol, between 60 mol percent and 80 mol percent, between 65 mol percent and 80 mol percent, or between 70 mol percent and 80 mol percent of ethylenically unsaturated monomer.

In embodiments, the unsaturated polyester resin is derived from between 10 mol percent and 50 mol percent, between 20 mol percent and 45 mol percent, or between 30 mol percent and 45 mol percent of the first monomer.

In embodiments, the unsaturated polyester resin is derived from between 5 mol percent and 50 mol percent, between 10 mol percent and 50 mol percent, or between 25 mol percent and 40 mol percent of the second monomer.

The viscosity of the unsaturated CPE resin at 120° C. may be from 100 to 600 Poise, or from 200 to 500 Poise. The acid value of the unsaturated CPE resin may be from 3 to 20, or from 5 to 20 KOH/g.

In embodiments, there are provided an unsaturated polyester resin comprising (or derived from) an ethylenically unsaturated monomer (such as fumaric acid), a first monomer (such as, 1,4-butanediol), and a second monomer (such as, 1,6-hexane-diol). In further embodiments, the unsaturated polyester resin may be derived from between 49 mol percent and 51 mol percent of an ethylenically unsaturated monomer (such as fumaric acid), from between 25 mol percent and 45 mol percent of an a first monomer (such as, 1,4-butanediol), and from between 10 mol percent and 30 mol percent of a second monomer (such as, 1,6-hexane-diol). In further embodiments, the unsaturated polyester resin may be derived from between 49 mol percent and 51 mol percent of an ethylenically unsaturated monomer (such as fumaric acid), from between 30 mol percent and 40 mol percent of an a first monomer (such as, 1,4-butanediol), and from between 10 mol percent and 30 mol percent of a second monomer (such as, 1,6-hexane-diol).

The unsaturated CPE particles may have a circularity of from about 0.950 to about 0.975, from about 0.980 to about 0.990, or greater than 0.980, measured by Sysmex FPIA 3000 Flow Particle Image Analyzer. The average particle sizes range from 5 to 120 microns, from 15 to 75 microns, or from 20 to 60 microns with narrow size distributions (both volume and number), measured by the Coulter Counter (Multisizer III).

In embodiments, the unsaturated polyester resin has a yield stress in a range from about 10 megapascals to about 100 megapascals.

In embodiments, the unsaturated polyester resin has a yield strain in a range from about 1% to about 10%.

In embodiments, the unsaturated polyester resin has a Young's Modulus in a range from about 0.5 to about 5 gigapascals.

In embodiments, the unsaturated polyester resin has a breaking strain in a range from about 10% to about 100%.

In embodiments, the unsaturated polyester resin has a breaking stress in a range from about 10 megapascals to about 100 megapascals.

In embodiments, the unsaturated polyester resin (i.e., the uncured unsaturated polyester resin) has a melting temperature of from about 75° C. to about 110° C.

In embodiments, the unsaturated polyester resin has a crystallization temperature (Tc) of from about 50° C. to about 70° C.

In embodiments, the unsaturated polyester resin may be cured with the thermal initiator at a curing temperature above the melting point temperature (Tm) of the unsaturated polyester resin. In embodiments, the unsaturated polyester resin may be mixed and heated with an oil, and a thermal initiator at a curing temperature above the melting point temperature (Tm) of the unsaturated polyester resin to form a microparticle composite. In embodiments, the curing temperature is in the range of from about 10° C. to about 30° C., from about 20° C. to about 30° C., or from about 10° C. to about 15° C. higher than the unsaturated polyester resin's melting point. In embodiment, the curing can be performed by applying a $CO_2$ laser to a mixture including the unsaturated polyester resin and the thermal initiator. In embodiments, a pressure may be applied to the mixture including the unsaturated polyester resin and the thermal initiator.

After curing the unsaturated polyester resin with the thermal initiator, a microparticle composite is formed having a crosslinking property. The microparticle composite may have a particle size of from about 3 microns to about 100 microns in volume average diameter, or in embodiments of from about 4 microns to about 90 microns in volume average diameter, or in embodiments of from about 10 microns to about 80 microns in volume average diameter.

In embodiments, the cured unsaturated polyester resin has a yield stress in a range from about 10 megapascals to about 100 megapascals.

In embodiments, the cured unsaturated polyester resin has a yield strain in a range from about 1% to about 10%.

In embodiments, the cured unsaturated polyester resin has a Young's Modulus in a range from about 0.5 to about 5 gigapascals.

In embodiments, the cured unsaturated polyester resin has a breaking strain in a range from about 10% to about 100%.

In embodiments, the cured unsaturated polyester resin has a breaking stress in a range from about 10 megapascals to about 100 megapascals.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

General Resin Synthesis

Examples 1 and 2 describe the preparation and characterization of the polyester resins in accordance with embodiments disclosed herein.

Example 1

Crystalline Unsaturated Polyester (CPE)—Resin 1

Figure 4:
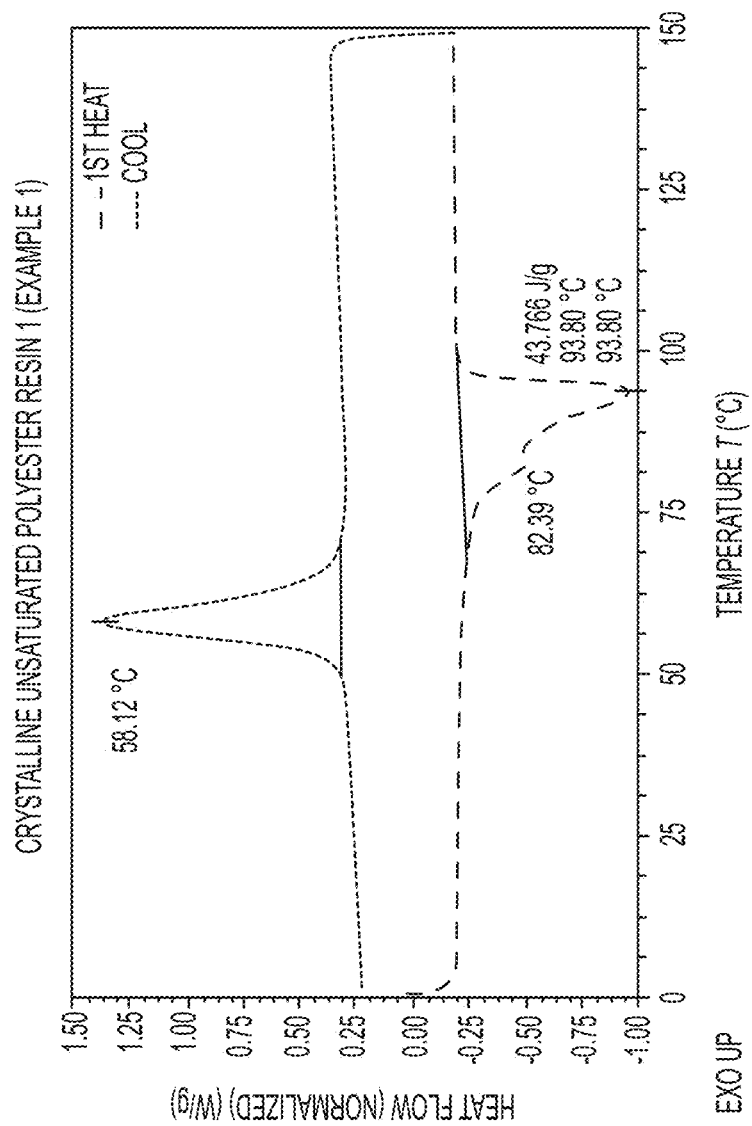
FIG. 4 shows the differential scanning calorimetry (DSC) data of Crystalline Polyester Resin 1 according to certain embodiments of the disclosure.

A 2 Liter Buchi Reactor equipped with a mechanical stirrer, distillation apparatus and bottom drain valve was charged with Fumaric acid (5.00 moles), 1,4-Butanediol (1.27 moles), and 1,6-Hexanediol (3.83 moles). The mixture was heated under nitrogen to 165° C. over a 1 hour period. Stirring was started when the batch temperature reached 120° C. The reaction temperature was then increased by 0.5° C. per minute until the batch temperature reached 191° C. Viscosity measurement was taken with a Brookfield viscometer at 120° C. (100 rpm), and then periodically sampled until the viscosity reached 315 Pa. The reaction mixture was discharged into a metal container and allowed to cool overnight to room temperature. FIG. 4 shows the differential scanning calorimetry (DSC) data of Crystalline Unsaturated Polyester Resin 1 confirming the unsaturated polyester resin properties according to the present embodiments (the DSC data was obtained on a Q2500 Differential Scanning calorimeter (TA Instruments) at a rate of 10° C./min from 0° C. to 150° C. to 0° C.

Example 2

Crystalline Unsaturated Polyester (CPE)—Resin 2

Crystalline Unsaturated Polyester (CPE) Resin 2 was prepared by the procedure of Example 1 using the conditions discussed therein.

Figure 5:
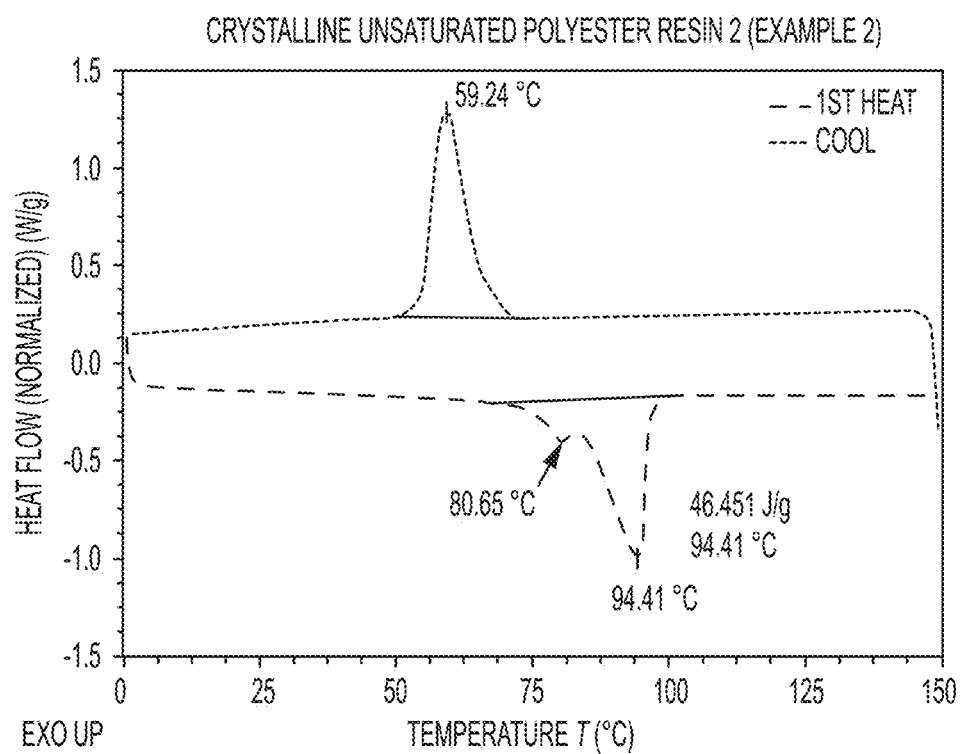
FIG. 5 shows the differential scanning calorimetry (DSC) data of Crystalline Polyester Resin 2 according to certain embodiments of the disclosure.

Examples 3-6 describe the preparation of Unsaturated Crystalline Polyester (CPE) Microparticles from Resins 1 and 2 (Examples 1 and 2). FIG. 5 shows the differential scanning calorimetry (DSC) data of Crystalline Unsaturated Polyester Resin 2 confirming the unsaturated polyester resin properties according to the present embodiments (the DSC data was obtained on a Q2500 Differential Scanning calorimeter (TA Instruments) at a rate of 10° C./min from 0° C. to 150° C. to 0° C.

Example 3

Preparation of CPE Microparticles in Oil By Hot Melt Extrusion According to Embodiments of the Disclosure A Haake small-scale double screw extruder was used for the preparation of the microparticles. 30 grams of CPE was held constant for all the batches, while the amount of oil was varied. (prepared from either Example 1 or 2) and polydimethylsiloxane (PDMS) For instances, for a 1:1 of CPE to PDMS oil, the amount of CPE was 30 grams and the amount of PDMS oil was also 30 grams. The CPE and PDMS oil were premixed and fed through the Haake extruder. The specific ratio of CPE to polydimethylsiloxane (PDMS), and the parameters (temperature, rotation speed, time, and system torque) for each extrusion run is summarized in Table 1 below. After extrusion, the CPE microparticles were discharged onto an aluminum pan and cooled to room temperature. The CPE/oil slurry was placed in a beaker with about 200 ml of ethyl acetate and mixed with an overhead stirrer for about 20 minutes. The unwanted PDMS/ethyl acetate mixture was removed by vacuum filtration using Whatman #1 90 mm filter paper to collect the CPE microparticles. This washing procedure was repeated one more time. After the final filtration, the "clean" microparticles (i.e., product) were then air dried overnight in an aluminum pan in the fumehood to allow any residual ethyl acetate to evaporate.

TABLE 1

| Batch No. | Resin | PDMS Oil Viscosity | Parts CPE to Oil | CPE amt. (g) | Oil amt. (g) | Set Temp. Extruder | Melt Temp. CPE/oil | RPM/Time (mins) | Torque (megagram) |
|---|---|---|---|---|---|---|---|---|---|
| 1 | 1 | 18-22K* | 1:1.66 | 30 | 49.8 | 120° C. | 124° C. | 200/15 mins | 0 |
| 2 | 1 | 18-22K* | 1:1.66 | 30 | 49.8 | 100° C. | 103° C. | 200/15 mins | 0 |
| 3 | 1 | 18-22K* | 1:1 | 30 | 30 | 100° C. | 103° C. | 200/15 mins | 10-20 |
| 4 | 1 | 18-22K* | 1:0.9 | 30 | 27 | 100° C. | 103° C. | 200/15 mins | 10-20 |
| 5 | 2 | 18-22K* | 1:1 | 30 | 30 | 100° C. | 104° C. | 200;/15 mins | 20 |
| 6 | 2 | 60K** | 1:1 | 30 | 30 | 100° C. | 104° C. | 200/15 mins | 30-40 |
| 7 | 1 | 60K** | 1:1 | 30 | 30 | 100° C. | 104° C. | 200/15 mins | 30-40 |

*PDMS oil viscosity in cSt (Sigma Aldrich);
**PDMS oil from Clearco in cSt

Table 2 summaries the particle size distribution of the CPE microparticles prepared in Example 3.

| Batch No. | Volume/Number $D_{50}$ (μm) | Volume/Number GSD |
|---|---|---|
| 1 | 46.75/20.22 | 1.40/2.20 |
| 2 | 43.32/17.17 | 1.47/2.11 |
| 3 | 51.00/31.59 | 1.42/1.91 |
| 4 | 60.71/37.19 | 1.42/1.76 |
| 5 | 73.05/34.84 | 1.43/2.32 |
| 6 | 81.45/16.98 | 1.38/2.84 |
| 7 | 79.69/16.26 | 1.34/2.90 |

Example 4

Preparation of CPE Microparticles in Oil Without the Use of Hot Melt Extrusion (Control Method)

Figure 9A:
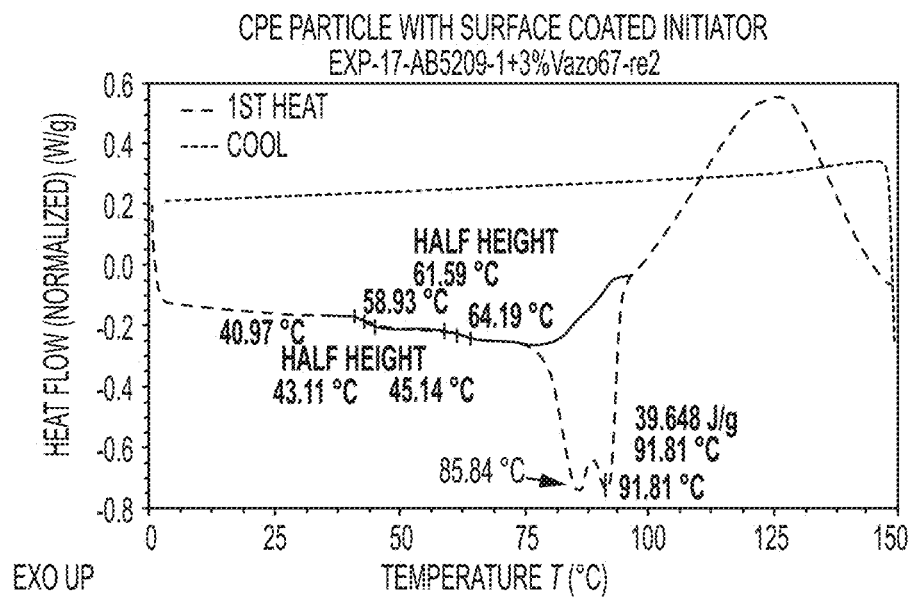
FIGS. 9a and 9b show that the application of Vazo 67 initiator to the CPE microparticles results in a thermal crosslinking reaction after the first heating during a differential scanning calorimetry (DSC) experiment.
Figure 9B:
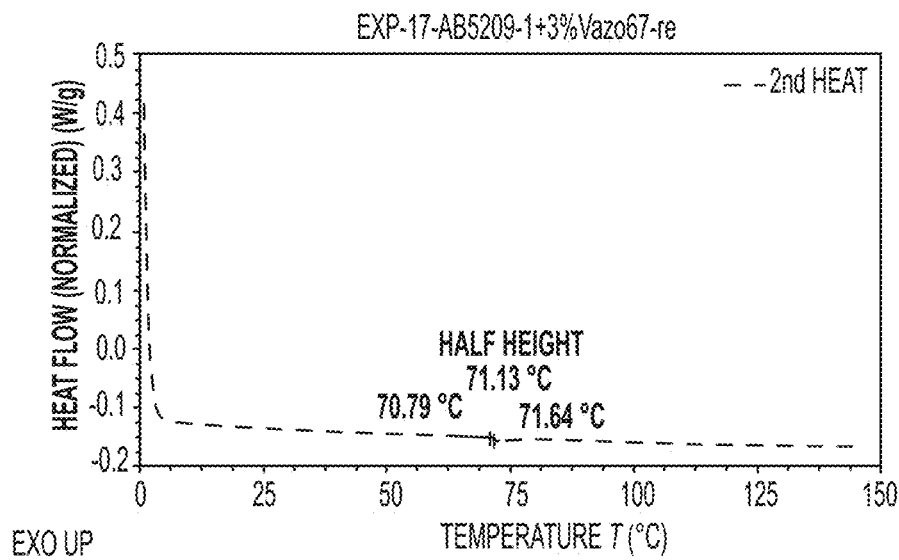

CPE Resin 1 were used for preparation of CPE microsphere in oil without the use of hot melt extrusion. Added to an aluminum pan was 30.0 g of CPE Resin 1 and 40 g of PDMS oil (18-22K cSt poly(dimethylsiloxane) hydroxy terminated oil. The materials were heated and mixed continuously on a hot plate with a set temperature of 200° C. The mixing continued for 15 minutes until the resin and oil resulted in a uniform phase. The pan was removed from the heat and allowed to cool to room temperature without stirring. The particle/oil slurry was transferred into a beaker to which 200 g of ethyl acetate was added and the contents was stirred by hand with a spatula to mix slurry with ethyl acetate. The slurry was then collected via filtration onto a Whatman #3 filter paper. The particles were collected from the filter paper and washed/rinsed/filtered 5 more times with ethyl acetate. The particles were allowed to air dry in a dish under fumehood for 24-48 hours. A sample of Batch 8 was mixed with 3% Vazo 67 (2,2'-Azodi(2-methylbutyronitrile)) initiator to test for crosslinking as seen in FIGS. 9a and 9b. About 10 g of Batch 8 microparticles were mixed with 0.03 g of Vazo 67 below its 10-hr half-life of 67° C. (153° F.)

Another batch was prepared exactly as the above but using a lower resin to oil ratio. These microparticles were prepared using 50 g of 18-22K cSt poly(dimethylsiloxane) hydroxy terminated oil with 30 g resin.

| Batch No. | Volume/Number $D_{50}$ (μm) | Volume/Number GSD |
|---|---|---|
| 8 | 75.44/22.78 | n/a |
| 9 | 66.51/19.30 | n/a |

Figure 6:
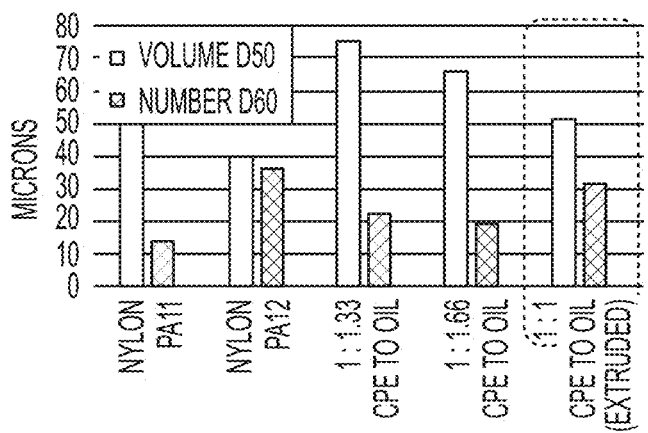
FIG. 6 shows the volume and number D50 of the commercial Nylon PA11 and Nylon PA12 compared to CPE microparticles made by both the extruded particle process and the control process.

Comparing the extruded particle process described according to embodiments of the disclosure (Example 3) and the control process (Example 4), it was observed that the extruded particle process produced microparticles with less fines and a higher number count. FIG. 6 shows the volume and number D50 of the commercial Nylon PA11 and Nylon PA12 compared to CPE microparticles made by both the extruded particle process and the control process.

Figure 7:
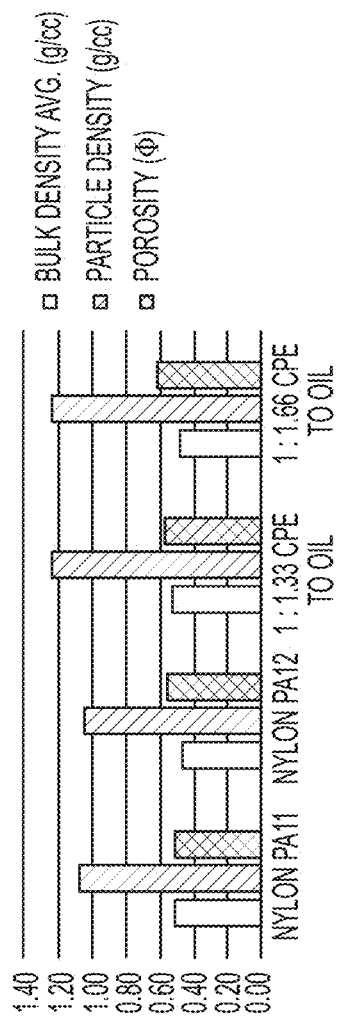
FIG. 7 compares the bulk density, particle density and porosity of the CPE microparticles made by the control method and those of the commercial Nylon PA11 and PA12.

The processes described in Example 3 and 4 above resulted in microparticles with no evidence of internal voids or pores. FIG. 7 compares the bulk density, particle density and porosity of the CPE microparticles made by the control method and those of the commercial Nylon PA11 and PA12.

Figures 8A, 8B, 8C:
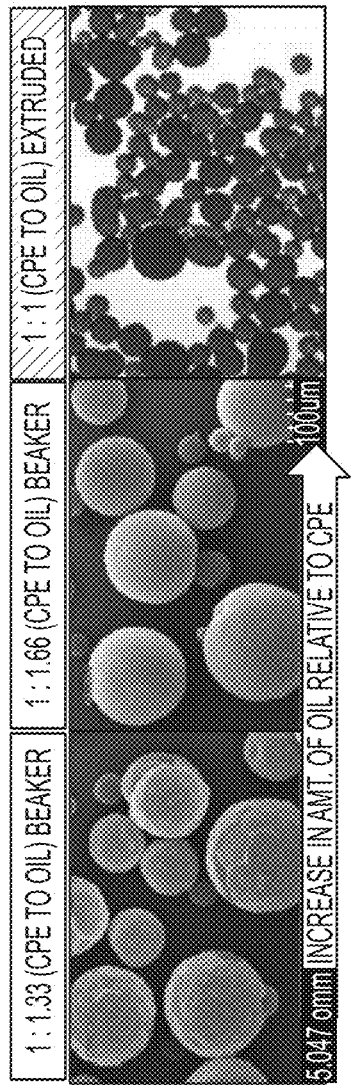
FIGS. 8a and 8b are SEM images showing the sphericity and distribution of the CPE particles produced by the control process.
FIG. 8c is an optical microscope showing the sphericity and distribution of the CPE particles produced by the extruded particle process.

FIGS. 8a and 8b are SEM images showing the sphericity and distribution of the CPE particles produced by the control process. FIG. 8c is an optical microscope showing the sphericity and distribution of the CPE particles produced by the extruded particle process. These figures illustrate that the CPE particles produced by the extruded particle process are a little more "potato-like" in shape and contain less fines than those produced by the control process. FIGS. 8d-f show the particle size distribution data of the CPE microparticles made from 1:1.33 (CPE to PDMS) using the control process, the CPE microparticles made from 1:1.66 (CPE to PDMS) using the control process, and the CPE microparticles made from 1:1 (CPE to PDMS) using the extruded particle process, respectively.

Example 5

Testing for Residual PDMS Oil by Si Inductively Coupled Plasma (ICP)

After washing with ethyl acetate, a few samples of microparticles were submitted for ICP analysis for silica content. The amount of Si present in sample indicates an approximation of how much PDMS is left behind the CPE microparticles. It was found that about 55 ppm Si was present in particles containing thermal initiator Example 4 Batch 8 with 3% Vazo67 on surface of microparticles, while 92 ppm Si was found in particles without thermal initiator Example 4 Batch 8. For the sample containing 92 ppm Si, it is estimated that about only 0.242 g PDMS is present within 1000 g of particles, this is expected to be present on the surface of the CPE microparticles and not within the particle matrix.

Example 6

Strengthening of CPE Microparticles through Thermal Crosslinking

Figure 9C:
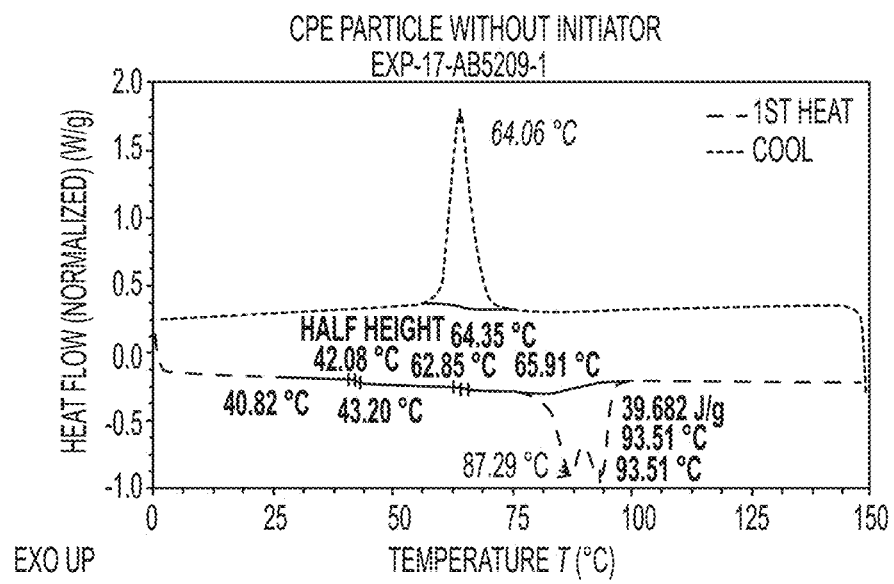
FIGS. 9c and 9d shows a control differential scanning calorimetry (DSC) experiment of the CPE microparticles with no application of a thermal initiator.
Figure 9D:
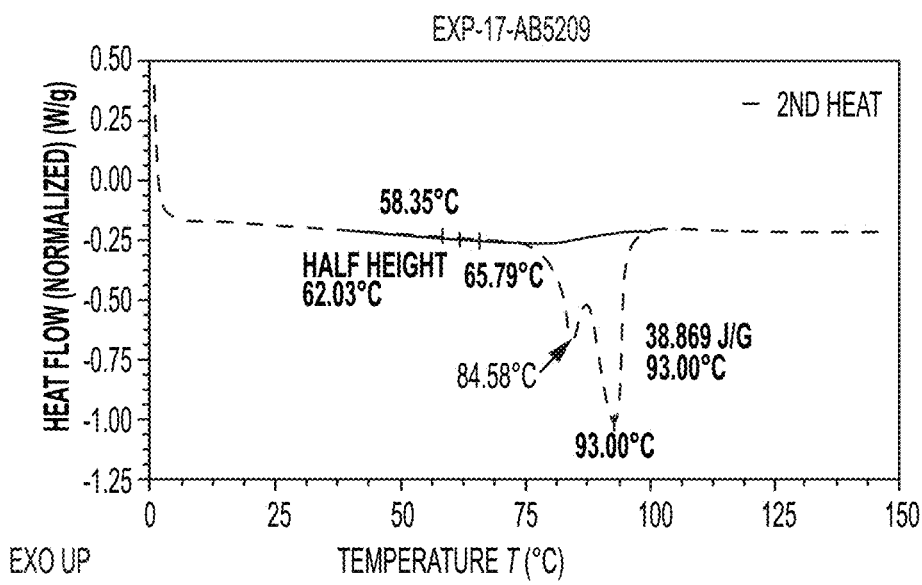

FIG. 9a shows that the application of Vazo 67 initiator to the CPE microparticles results in a thermal crosslinking reaction after the first heating during a differential scanning calorimetry (DSC) experiment. FIG. 9b shows that after the CPE microparticles were heated the second time, no melting point was seen since the CPE microparticles have been crosslinked and were not able to flow freely during the heat cycle. FIG. 9c shows the first heat and cool of CPE microparticles without initiator, the typical melt point and crystallization peaks were observed. FIG. 9d shows the second heat of the same CPE microparticles and its melting point, indicating that no crosslinking was present.

Example 7

SLS Printing

Dried powder materials Example 4 Batch 8 were submitted for preliminary sintering tests on a Sharebot SnowWhite SLS printer ("SnowWhite"), which determined the baseline performance of the dried powders. The SnowWhite is a professional 3D printer that uses a $CO_2$ laser to sinter thermoplastic powders in a layer-by-layer fashion. The laser selectively fuses the material by scanning cross-sections of the desired object generated using a computer-aided design (CAD) model. After the first layer is scanned, the powder bed is lowered, new powder material is rolled on top, and the subsequent layer is scanned until the part is completed. The main advantage of the powder-based system compared with other additive manufacturing techniques is the elimination of—printing supports and the ability to reuse materials.

The procedure for SLS printing on the SnowWhite is as follows.
1. A layer of CPE microparticles were applied onto an aluminum plate.
2. A bar coater of 40 mil gap (~1 mm) was used to even out the CPE microparticles (powder).
3. The powder bed temperature was adjusted accordingly for specific material tested.
4. The build chamber temperature was set at 23° C. (reflective of ambient temperature) but not controlled by instrument.
5. The wait time before the build was set to 1200 seconds to ensure that temperature stabilizes prior to the printing process.
6. The laser rate was set at either 1200 mm/s or 1600 mm/s.
7. The laser power was varied and was set at either 30 or 60%. The maximum laser power is defined as 100% powder, there is no translation to temperature.
8. The chamber, powder and fabricated object was allowed to cool before removing from the chamber.

Example 8

Detectability

The CPE microparticles structure can be determined by Nuclear Magnetic Resonance (NMR) and once a thermal initiator is added, such as Vazo 67, the crosslinked structure is more evident by thermal analysis tools such as thermogravimetric analysis (TGA) and differential scanning calorimetry (DSC). TGA can give information about the composition of the sample as well as its thermal stability while DSC measures the change in the amount of heat required to increase the temperature of a sample measured as a function of temperature. Fourier-transform infrared spectroscopy (FTIR) can be used to investigate the vibrational properties of molecule. It is used to determine the types of chemical bonding that are present in a sample but exploiting the fact that molecules absorb specific frequencies of infrared radiation that are characteristic of their structure and which excite them to a higher vibrational energy level.

What is claimed is:
1. A process for making a composition comprising:
providing an unsaturated polyester resin comprising:
an ethylenically unsaturated monomer having the formula I

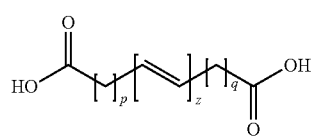

I wherein p and q are each independently 0 to 8, and z is 1 to 5,
a first diol monomer; and a second diol monomer;

mixing and heating a mixture comprising the unsaturated polyester resin and an oil at a temperature above the melting point temperature (Tm) of the unsaturated polyester resin, and applying a pressure to the mixture to form a microparticle composite;

washing the microparticle composite with an organic solvent to reduce the amount of oil present in the microparticle composite;

adding a thermal initiator to the microparticle composite; and removing the organic solvent to form the composition comprising microparticles with the thermal initiator on the surface of the microparticles.

2. The process of claim 1, wherein the ethylenically unsaturated monomer is selected from the group consisting of maleic acid, maleic anhydride, fumaric acid, chloromaleic acid, itaconic acid, 3-hexenedioic acid, 2-heptenedioic acid, 2-octenedioic acid, glutaconic acid, 2-decenedioic acid, traumatic acid, muconic acid, mesaconic acid, citraconic acid, and esters and mixtures thereof.

3. The process of claim 1, wherein the weight ratio of the oil to the unsaturated polyester resin is from about 1.0:1.6 to about 1.1:1.0.

4. The process of claim 1, wherein the oil is selected from poppy seed oil, olive oil, peanut oil, sesame oil, cotton seed oil, soybean oil, safflower oil, corn oil, sunflower seed oil, canola oil, mineral oil, long chain paraffinic oil, liquid petrolatum, polydimethylsiloxane (PDMS), ethylmethylpolysiloxane, a copolymer of diraethylsiloxane and methylvinylsiloxane, hexamethyldisiloxane, octamethyltrisiloxane, octamethyltetracyclosiloxane, decamethylpentacyclosiloxane, and mixtures thereof.

5. The process of claim 1, wherein the ethylenically unsaturated monomer is present from about 30 to about 95 mole percent (mol %) of the unsaturated polyester resin.

6. The process of claim 1, wherein the unsaturated polyester resin has a crystallization temperature (Tc) of from about 50° C. to about 70° C.

7. The process of claim 1, wherein the heating temperature is from about 75 to about 150° C.

8. The process of claim 1, wherein the pressure is from 0 to about 50 meter grams (mg).

9. The process of claim 1, wherein the thermal initiator is selected from the group consisting of ammonium persulfate, sodium persulfate, potassium persulfate, organic peroxides, 2,2'-azobis(2-methylpropanenitrile), 1,1'-azobis(cyanocyclohexane), 2, 2'-azobis(2-methyl-N-phenylpropionamidine) dihydrochloride, 2,2'-azobis[N-(4-chlorophenyl)-2-methylpropionamidine]dihydrochloride, 2,2'-azobis[N-(4-hydroxyphenyl)-2-methylpropionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, and mixtures thereof.

* * * * *